Feb. 5, 1935.    C. V. JOHNSON    1,990,033
OLEO GEAR
Filed Oct. 31, 1930
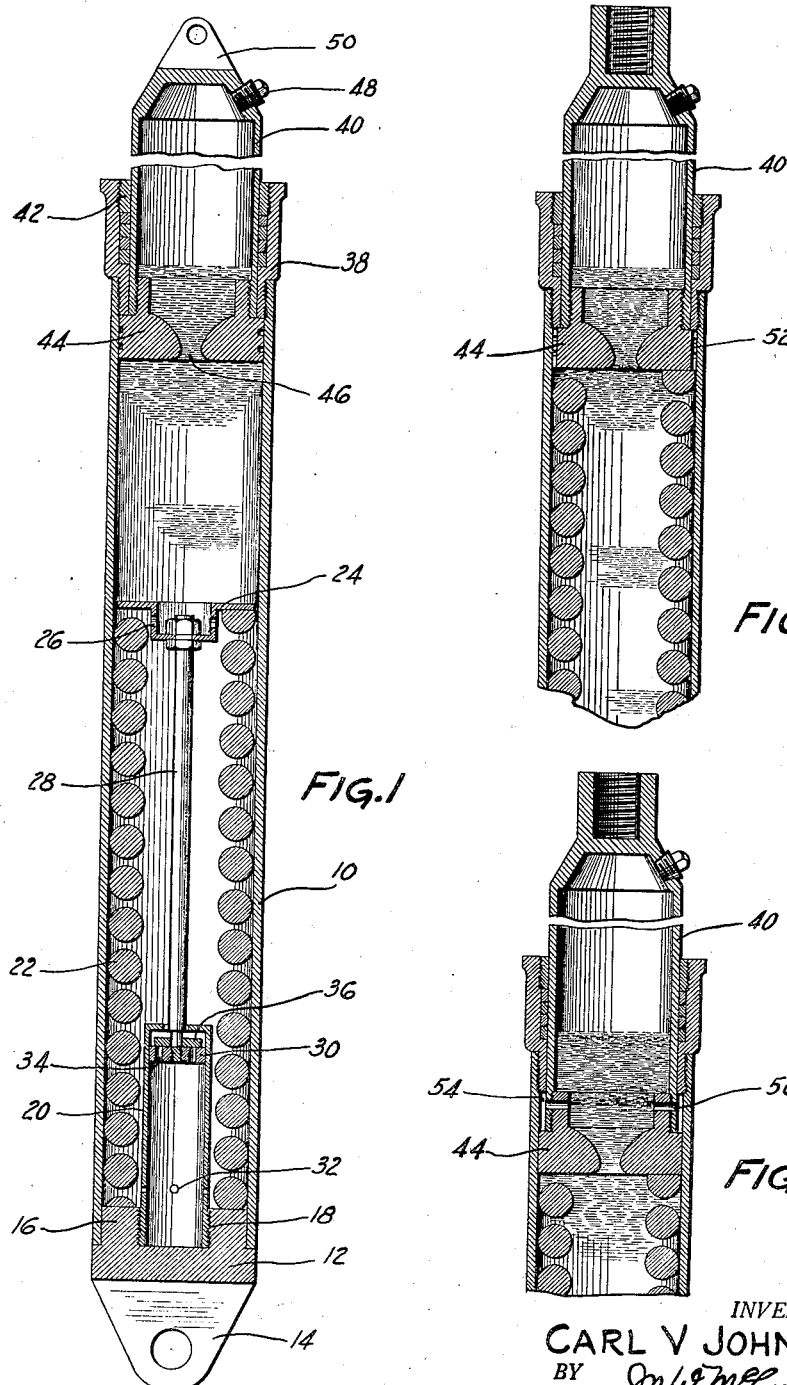
INVENTOR.
CARL V JOHNSON
BY M.W. McConkey
ATTORNEY Patented Feb. 5, 1935

1,990,033

UNITED STATES PATENT OFFICE 1,990,033

OLEO GEAR

Carl V. Johnson, South Bend, Ind., assignor to Bendix Research Corporation, South Bend, Ind., a corporation of Indiana Application October 31, 1930, Serial No. 492,416

13 Claims. (Cl. 267—34)

This invention relates to shock absorbers and more particularly to airplane shock struts.

Heretofore, shock absorbers or aircraft shock struts have been designed to hydraulically check or damp rebound. Generally, such checks operate against a pneumatic spring which takes the initial landing shock as well as the taxiing shocks. Such snubbers then must serve to dissipate a large amount of energy in the rebound from the landing shock and the small amounts which appear in the taxiing shock.

The present invention aims to overcome these objections and to smooth out and absorb both the main shock of the initial landing and other minor shocks as the aircraft taxies over rough or uneven ground by effectively reducing the rebound from either the landing or taxiing shock through a snubbing action of a hydraulic unit.

A major object of the invention is to provide a shock absorber especially designed for aircraft, including both a liquid damping means for absorbing the initial shock of landing and means for resiliently supporting the load, the resilient means having an effective snubbing means for absorbing the taxiing shock rebound.

Another object of the invention is to provide a shock absorber for aircraft having means for absorbing the initial landing shock and means including a resiliently taxiing feature hydraulically snubbed to absorb taxiing shock rebound.

Other objects of the invention will appear from the following description taken in connection with the drawing which forms a part of this specification, and in which:

Figure 1 is a sectional view of an airplane shock strut embodying the invention;

Figure 2 is a modified form; and

Figure 3 illustrates a further modification.

Referring to the drawing for more specific details of the invention, 10 represents a cylindrical casing or shell having on one end thereof a cap 12 formed with clevis 14 providing suitable means for attaching an axle for the landing wheels of a plane. It will, of course, be understood that other attaching means may be provided.

As shown, the cap 12 has a flange 16 fitted snugly in one end of cylindrical casing or shell 10 and the flange is internally threaded as indicated at 18 to receive and support a cylinder 20, to be hereinafter referred to. Positioned within the cylindrical casing or shell 10 is a coil spring 22 having one end seated upon the flange 18 and its other end abutting a movable diaphragm 24. This diaphragm is provided with ports or openings 26 to permit free passage of damping fluid or oil contained within the casing and a rod 28 extending through an opening in the head of the cylinder 20 connects the diaphragm to a piston 30 positioned for movement within the cylinder. The opening in the head of the cylinder through which the rod reciprocates is sufficiently large to adequately meter the oil from the cylinder, and the cylinder is provided adjacent its base with a plurality of orifices 32 permitting a free circulation of oil between the casing and the cylinder. The piston 30 has a plurality of ports 34 controlled by a flap valve or disk 36 slidable on the rod 28.

The cylindrical member or casing 10 has threaded in its other end a sleeve or collar 38 in which is positioned for movement a cylindrical casing or shell 40 adapted to telescope the cylindrical casing or shell 10. The sleeve 38 is provided with suitable packing to prevent leakage between the cylindrical casings 10 and 40 and a nut 42 for tightening the packing. Threaded in the inner end of the cylindrical casing 40 is a piston 44 having an orifice 46 and the outer end of the cylindrical casing 40 is closed and provided with a filling plug 48 and suitable means such as clevis 50 for attachment to a main structural member or a longéron such as are customarily provided at the bottom side portions of a plane.

Assuming that the casing 10 is filled with a damping fluid or a liquid such as oil, to a proper level that is above the main piston when in extended position on the collapsing stroke, oil is metered through the orifice 46 in the piston 44 into the casing 40. When the piston 44 depresses the spring 22, the valve 36 opens the ports 34, permitting the oil to flow freely through the snubber piston. On a rebound stroke, oil trapped above the snubber piston is slowly metered from the cylinder through the orifice around the piston rod to the outer chamber or the piston may have sufficient clearance to effectively meter the oil from above the piston to the space below it in the snubber cylinder to produce the desired snubbing effect. Since the entire unit is always submerged in the oil in the casing, no provision need be made for the wasting of oil.

Figure 2 illustrates a modified form of the invention wherein the desired snubbing effect of the resilient member is obtained by means of ducts or passages 52 in the piston 44. These passages extend from the head of the piston to a closed chamber 54 back of the piston between the inner wall of the cylindrical casing 10 and the outer wall of the cylindrical casing 40. In this modification, on the initial landing shock or collapsing stroke, a certain amount of oil is allowed to pass or is forced through the ducts or passages 52 into the closed compartment 54.

This action takes place at the same time that the main body of the oil is passing through the main orifices 46. On the extending stroke, the oil in the compartment 54 is necessarily forced back through the ducts or passages 52, thus producing snubbing effect.

Figure 3 illustrates a further modification wherein ducts or passages 56 extend through the wall of the cylindrical casing 40 and the skirt of the piston 44 provides a communication between the interior of the compartment 54 and the cylindrical casing just below the level of the oil in the casing. In this structure, the damping fluid is drawn by suction into the compartment on the collapsing stroke and forced out on the rebound stroke, thus serving to snub the rebound.

Regulation of the size of the ducts or passages and the number thereof and the size of the compartments will, of course, tend to regulate the amount of snubbing.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. An aircraft shock strut comprising a liquid damping means for absorbing an initial shock, means for resiliently supporting the load effective after the initial shock and means employing the liquid of the damping means for snubbing the resilient means.

2. An aircraft shock strut comprising a liquid damping means for absorbing an initial shock, a resilient member for supporting the load effective only after the initial shock and a hydraulic means acting on the liquid of the damping means for snubbing the resilient member.

3. An aircraft shock strut comprising a casing, a liquid damping means therein for absorbing an initial shock without rebound, a resilient member for supporting the load only after the initial shock and a hydraulic means acting on the liquid of the damping means for snubbing the resilient member.

4. An aircraft shock strut comprising a telescopic casing, an apertured piston secured to one section of the casing and movable within the other section of the casing, a compression spring positioned within the casing and a damping member cooperating with the spring.

5. An aircraft shock strut comprising cylindrical telescopic sections forming a casing, a compression spring positioned in one section of the casing, a piston cooperating with said section and carried by the other section and means within the casing for snubbing the spring.

6. An aircraft shock strut comprising a cylindrical casing, means closing one end of the casing, a compression spring supported on said means within the casing, a second casing adapted to telescope the first mentioned section, a piston cooperating with said first named casing and secured to the second mentioned casing and hydraulic means for snubbing the compression spring.

7. An aircraft shock strut comprising a fixed cylindrical casing having one end closed, a compression spring having one end seated in the closed end of the casing, hydraulic damping means for snubbing the spring, a movable casing telescoping the fixed casing and a piston secured to the inner end of the movable casing fitting snugly in the fixed casing.

8. An aircraft shock strut comprising a fixed casing having a closed end provided with a clevis, a compression spring having one end seated in the closed end of the casing, a cylinder supported in the closed end of the casing, a piston positioned for movement within the cylinder, means connecting the piston to the other end of the spring, a movable casing telescoping the fixed casing, a piston secured to the movable casing and adaptable for movement within the fixed casing and a filling plug in the movable casing.

9. An aircraft shock strut comprising a fixed casing having one end closed and provided with an attaching member, a compression spring seated in the closed end of the casing, a cylinder supported in the closed end of the casing between the convolutes of the spring, a piston having a valve associated therewith arranged for movement within the cylinder, an apertured diaphragm supported by the spring, a rod connecting the diaphragm with the piston, a movable casing telescoping the fixed casing, an apertured piston carried by the movable casing within the fixed casing and a filling plug for the movable chamber.

10. An aircraft shock strut comprising a fixed casing having a cap provided with a clevis, a compression spring having one end seated on the cap, an apertured diaphragm supported on the other end of the compression spring, a cylinder supported on the cap within the spring, inlet and outlet ports in the cylinder, a piston positioned for movement within the cylinder, a valve cooperating with the piston, a rod connecting the piston with the diaphragm, a movable casing adaptable for reciprocation within the fixed casing, an apertured piston secured to the inner end of the movable casing, means for admitting fluid to the casings and attaching means on the movable casing.

11. An aircraft shock strut comprising a telescopic member, a compression spring within the member, liquid within the member and two separate means acting on the liquid for dissipating energy on both the impact and rebound strokes of the member.

12. An aircraft shock strut comprising a telescopic member adapted to be compressed and extended, liquid within the member for dissipating energy on the collapsing stroke, a spring within the member for resiliently supporting the load, effective only after dissipation of the energy on the collapsing stroke, and means acting on said liquid for snubbing the spring immersed within the liquid.

13. A shock absorbing strut comprising telescopic cylinders closed at their opposite ends, an orificed piston carried by one of said cylinders adjacent its open end, a spring arranged in the other of said cylinders directly in the path of movement of said piston, shock absorbing liquid filling said other cylinder, and means associated with said spring and acting on said liquid for damping the recoil of said spring.

CARL V. JOHNSON.